United States Patent
Block et al.

(10) Patent No.: US 6,918,051 B2
(45) Date of Patent: Jul. 12, 2005

(54) NODE SHUTDOWN IN CLUSTERED COMPUTER SYSTEM

(75) Inventors: Timothy Roy Block, Rochester, MN (US); Robert Miller, Rochester, MN (US); Kiswanto Thayib, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 637 days.

(21) Appl. No.: 09/827,804

(22) Filed: Apr. 6, 2001

(65) Prior Publication Data

US 2002/0145983 A1 Oct. 10, 2002

(51) Int. Cl.⁷ .............................................. G06F 11/00
(52) U.S. Cl. ................... 714/4; 714/24; 714/31
(58) Field of Search ..................... 714/4, 10, 24, 714/31, 48

(56) References Cited

U.S. PATENT DOCUMENTS

| | | | |
|---|---|---|---|
| 5,590,277 A | 12/1996 | Fuchs et al. | |
| 5,704,031 A * | 12/1997 | Mikami et al. | 714/4 |
| 5,748,882 A | 5/1998 | Huang | |
| 5,748,883 A * | 5/1998 | Carlson et al. | 714/47 |
| 5,805,785 A | 9/1998 | Dias et al. | |
| 5,828,836 A | 10/1998 | Westwick et al. | |
| 5,991,518 A * | 11/1999 | Jardine et al. | 714/4 |
| 6,108,699 A * | 8/2000 | Moiin | 709/221 |
| 6,151,688 A | 11/2000 | Wipfel et al. | |
| 6,192,483 B1 | 2/2001 | Moiin et al. | |
| 6,243,814 B1 | 6/2001 | Matena | |
| 6,314,526 B1 * | 11/2001 | Arendt et al. | 714/4 |
| 6,393,485 B1 | 5/2002 | Chao et al. | |
| 6,438,705 B1 * | 8/2002 | Chao et al. | 714/4 |
| 6,442,713 B1 * | 8/2002 | Block et al. | 714/43 |
| 6,449,641 B1 | 9/2002 | Moiin et al. | |
| 6,460,149 B1 * | 10/2002 | Rowlands et al. | 714/43 |
| 6,493,715 B1 | 12/2002 | Funk et al. | |
| 6,526,521 B1 | 2/2003 | Lim | |
| 6,718,486 B1 | 4/2004 | Roselli et al. | |
| 2003/0159084 A1 * | 8/2003 | Murphy et al. | 714/13 |

OTHER PUBLICATIONS

U.S. patent application Ser. No. 09/697,398, entitled "Group Data Sharing During Membership Change in Clustered Computer System," filed on Oct. 27, 2000 by Miller et al. (ROC920000129US1).

U.S. patent application Ser. No. 09/718,924, entitled "Apparatus and Method for Communicating Between Computer Systems Using a Sliding Send Window for Ordered Messages in a Clustered Computing Environment," filed on Nov. 22, 2000 by Timothy R. Block. (ROC920000123).

U.S. patent application Ser. No. 09/809,408, entitled "Automated Node Restart in Clustered Computer System," filed on Mar. 15, 2001 by Jennifer Anne Dervin et al. (ROC920000313US1).

(Continued)

*Primary Examiner*—Robert Beausoliel
*Assistant Examiner*—Gabriel L. Chu
(74) *Attorney, Agent, or Firm*—Wood, Herron & Evans, LLP

(57) ABSTRACT

A clustered computer system, apparatus, program product and method utilize a group member-initiated shutdown process to terminate clustering on a node in an automated and orderly fashion, typically in the event of a failure detected by a group member residing on that node. As a component of such a process, node leave operations are initiated on the other nodes in a clustered computer system, thereby permitting any dependency failovers to occur in an automated fashion. Moreover, other group members on a node to be shutdown are preemptively terminated prior to local detection of the failure within those other group members, so that termination of clustering on the node may be initiated to complete a shutdown operation.

27 Claims, 2 Drawing Sheets

OTHER PUBLICATIONS

U.S. patent application Ser. No. 09/281,026, entitled "Cluster Node Distress Signal," filed on Mar. 30, 1999 by Block et al. (RO998–196), US 6442713.

U.S. patent application Ser. No. 09/481,177, entitled "Delivery of Configuration Changes in a Group Communication System," filed on Jan. 12, 2000 by Funk et al. (IS999009), US 6493715.

U.S. patent application Ser. No. 09/638,328, entitled "Merge Protocol for Clustered Computer System," filed on Aug. 14, 2000 by Miller et al. (ROC920000130US1).

U.S. patent application Ser. No. 09/920,470, entitled "Forwarding of Diagnostic Messages in a Group" filed on Aug. 1, 2000 by Miller et al. (ROC920000311US1).

* cited by examiner

NODE SHUTDOWN IN CLUSTERED COMPUTER SYSTEM

FIELD OF THE INVENTION

The invention is generally directed to clustered computer systems, and in particular, to the handling of clustering failures thereon.

BACKGROUND OF THE INVENTION

"Clustering" generally refers to a computer system organization where multiple computers, or nodes, are networked together to cooperatively perform computer tasks. An important aspect of a computer cluster is that all of the nodes in the cluster present a single system image—that is, from the perspective of a user, the nodes in a cluster appear collectively as a single computer, or entity.

Clustering is often used in relatively large multi-user computer systems where high performance and reliability are of concern. For example, clustering may be used to provide redundancy, or fault tolerance, so that, should any node in a cluster fail, the operations previously performed by that node will be handled by other nodes in the cluster. Clustering is also used to increase overall performance, since multiple nodes can often handle a larger number of tasks in parallel than a single computer otherwise could. Often, load balancing can also be used to ensure that tasks are distributed fairly among nodes to prevent individual nodes from becoming overloaded and therefore maximize overall system performance. One specific application of clustering, for example, is in providing multi-user access to a shared resource such as a database or a storage device, since multiple nodes can handle a comparatively large number of user access requests, and since the shared resource is typically still available to users even upon the failure of any given node in the cluster.

Clusters typically handle computer tasks through the performance of "jobs" or "processes" within individual nodes. In some instances, jobs being performed by different nodes cooperate with one another to handle a computer task. Such cooperative jobs are typically capable of communicating with one another, and are typically managed in a cluster using a logical entity known as a "group." A group is typically assigned some form of identifier, and each job in the group is tagged with that identifier to indicate its membership in the group.

Member jobs in a group typically communicate with one another using an ordered message-based scheme, where the specific ordering of messages sent between group members is maintained so that every member sees messages sent by other members in the same order as every other member, thus ensuring synchronization between nodes. Requests for operations to be performed by the members of a group are often referred to as "protocols," and it is typically through the use of one or more protocols that tasks are cooperatively performed by the members of a group.

Clustered computer systems place a high premium on maximizing system availability. As such, automated error detection and recovery are extremely desirable attributes in such systems. Some errors on a node may only require that individual members terminate, while others may require that an entire node (including all members and the clustering infrastructure) ultimately terminate. To maintain system availability and integrity, the members of each group are often required to know what other members currently exist in their group. Thus, whenever a member or node fails, members on other nodes in a clustered computer system typically must be notified that certain members are leaving their respective groups.

To handle such notification, many clustered computer systems rely on protocols known as membership change protocols to distribute membership change information to the various members of a group. Membership Change Messages (MCM's) are typically used to initiate membership change protocols, and in some systems, reasons for a membership change are incorporated into the messages. Two such types of reasons are "member leave" and "node leave", with the former indicating that a particular member on a node is leaving a group, and the latter indicating that all members on a node are leaving their respective groups.

Node leave membership changes are typically utilized whenever a failure is detected that affects all clustering on a node—typically responsive to detection of a failure by the clustering infrastructure for that node. However, a number of types of failures may be detected by individual members, and conventionally, a member that detects an error or failure will initiate a member leave membership change to unregister itself from its group. Member-detected errors, for example, are often tied to attempts to access a resource with a member job, whereby a failure is detected whenever the access attempt is unsuccessful. For example, for a resource such as a database or a file system, an error may be detected in response to an unsuccessful access attempt to that resource.

Through the use of member-initiated membership changes, unregistration of individual members is often haphazard and inefficient, given that each member that accesses a failed resource will not initiate a membership change until an access attempt is made on that resource. Some members may rarely, if ever, access a failed resource, so a substantial amount of time could pass between failure detections by multiple members on a node.

Some member-detected errors may ultimately require that an entire node be unregistered from a cluster. Nonetheless, rather than performing a node leave membership change, individual member leave membership changes are typically performed one-by-one by members as they individually detect the errors. In addition to the inefficiency of processing the multiple membership changes, data synchronization and other errors can arise that compromise the integrity of a clustered computer system.

As an example, member-detected errors are particularly problematic when dealing with dependent groups. A dependent group relationship may exist between two groups when one group (referred to as a source group) is required to be active for another group (referred to as a target group) to function properly. For example, a dependent group relationship may exist between a database group and a file access group, since the activities of a database system ultimately depend on the ability to retrieve the data in the database from an external file system. Likewise, applications and data groups may be related as dependent groups, as an application may not be capable of executing without access to its important data.

In clustered computer systems where multiple nodes may manage a shared resource such as a database or file system, the failure in a member that accesses a resource often requires a "failover" to occur to shift the access point for a resource from the node the failed member was on to another member on another node. For example, if a database engine on a node fails, control of the access to the database typically must be shifted to another node to maintain availability of the database.

With dependent groups, a failover of a target group cannot occur until after a source group failover has been completed. Thus, for example, in the case of a database/file access dependency, a database group failover cannot occur before a file access group completes its failover.

In the case of node failures which initiate node leave membership changes, dependent failovers are conventionally handled automatically during processing of the node leave MCM protocols, using proper ordering to ensure that a source group fails over before any target group that depends on the source group does so. Moreover, in the event of a node leave, a target group is assured that the source group will also failover, so it is permissible for a target group to wait for a source group failover to occur once a node leave operation is initiated. This occurs even if the target group receives a node leave Membership Change Message prior to the source group, which is important in a clustered computer system as communication delays and message ordering rules may cause different orderings of MCM protocols to occur, i.e., it sometimes cannot be assured that a message to initiate a source group failover will be sent before a message to initiate a target group failover. In some clustered computer systems, a target MCM protocol may be held off until after a source MCM protocol is delivered.

In the event of a member-detected failure, however, or any other event that initiates a member leave membership change, it is often not possible to ensure dependent failovers can occur, because a target group cannot be ensured that a source group will failover as well. Thus, waiting for a source to failover when a target failover needs to be performed could cause the target group to hang, particularly if a source does not detect the error that caused the target group to initiate the membership change. In addition, a risk of data corruption may exist between source members whenever a target failure occurs without an attendant source failover. For this reason, the use of member leave membership changes to initiate failovers in response to detected errors can be inefficient and unreliable.

Therefore, a significant need exists in the art for a manner of further automating the process of detecting and handling detected errors in a clustered computer system, in particular, to handle dependency failovers in response to member-detected errors in an automated and efficient manner.

SUMMARY OF THE INVENTION

The invention addresses these and other problems associated with the prior art in providing a clustered computer system, apparatus, program product and method that utilize a group member-initiated shutdown process to terminate clustering on a node in an automated and orderly fashion, typically in the event of a failure detected by a group member residing on that node. As a component of such a process, node leave operations are initiated on the other nodes in a clustered computer system, thereby permitting any dependency failovers to occur in an automated fashion. Moreover, other group members on a node to be shutdown are preemptively terminated prior to local detection of the failure within those other group members, so that termination of clustering on the node may be initiated to complete the shutdown operation in an orderly and efficient manner.

Furthermore, in certain embodiments of the invention, should another group member on a node to be shutdown detect a failure prior to termination of such group member, functionality may be incorporated to disregard such detected failure and thereby prevent multiple attempts to shutdown the node. Among other advantages, such functionality may prevent the initiation of member leave operations on other nodes, which might otherwise hamper attempts to handle dependency failovers on the other nodes.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments described hereinafter utilize a member job resident on a node in a clustered computer system to initiate an ordered and automated shutdown of that node with little or no operator intervention, and with automated handling of dependent group failovers. In many respects, the automated node shutdown functionality described herein may be considered to effectively convert a member leave membership change protocol that would conventionally occur in response to a member-detected failure into a node leave membership change protocol. As a result, the automated handling of dependent failovers that is conventionally performed for node leave membership changes may effectively be utilized to handle member-detected failures on a node in an orderly and efficient manner.

Typically, a shutdown is desirable to permit a "failover" to occur, i.e., to permit access to a resource to be switched from one node to another. As discussed above, one difficulty associated with handling a node shutdown is that of dependent groups, where one group (typically referred to as a target group) depends from another group (typically referred to as a source group), and is required to failover only after failover of the source group has been initiated. Examples of dependent groups include database access groups that are dependent on file access groups, application groups that are dependent on database access groups, file access groups that are dependent on disk drive management groups, etc.

Also typically, a shutdown is desirable in response to detection of an error by a group member resident on a node. Various types of errors may initiate a shutdown consistent with the invention, including various communication protocol errors such as TCP/IP errors, loss of communication resources such as terminated network adaptors, a failure in a node's cluster name server, a failure in a cluster liveliness monitor, a failure in a cluster management/control job, damage/corruption of a critical node object, administrative end of a cluster-critical job (e.g., accidental or forced job kills by an administrator), etc. Moreover, in some instances it may be desirable to shutdown a node without detection of an error, e.g., in response to initiation of a shutdown by a member job resident on the node. As will become more apparent below, the manner in which dependent groups are handled in the embodiments illustrated herein facilitates the automated shutdown of a node regardless of the reason for the shutdown.

The principles of the invention may apply to various clustering environments, where multiple nodes collectively perform tasks, and typically present a single system image to external devices and users. A wide variety of clustering environments and clustering infrastructures may be utilized in connection with the invention.

Figure 1:
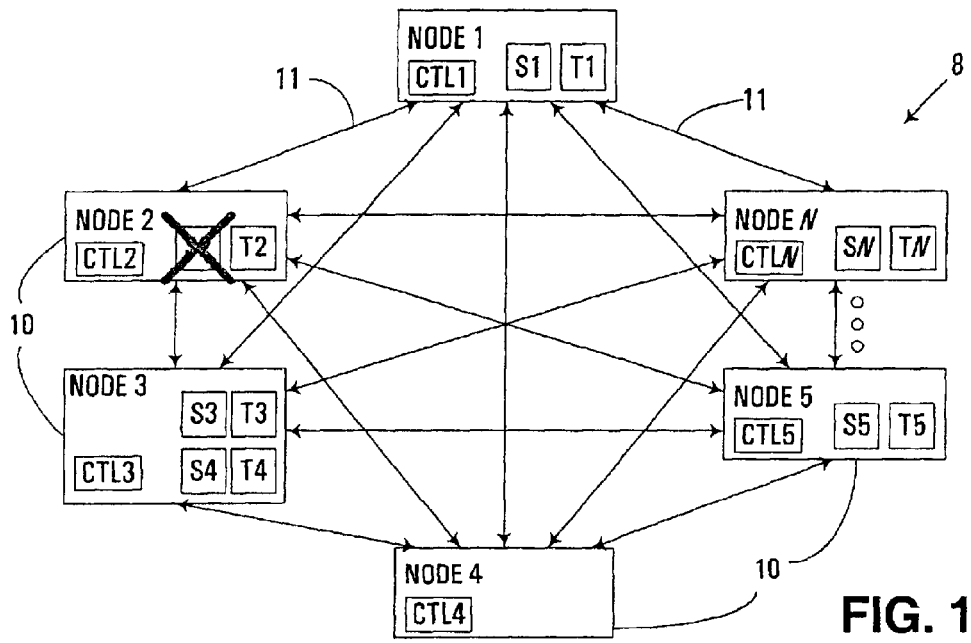
FIG. 1 is a block diagram of a clustered computer system consistent with the invention, illustrating an exemplary set of source and target groups, as well as a detected failure by a source group member on one of the nodes in the clustered computer system that requires a shutdown of such node.

As shown in FIG. 1, for example, a clustered computer system 8 may include a plurality of nodes 10 interconnected with one another via a network of interconnections 11. Any number of network topologies commonly utilized in clustered computer systems may be used consistent with the invention. Moreover, individual nodes 10 may be physically located in close proximity with other nodes, or may be geographically separated from other nodes, e.g., over a wide area network (WAN), as is well known in the art.

In the context of a clustered computer system, at least some computer tasks are performed cooperatively by multiple nodes executing cooperative computer processes (referred to herein as "jobs") that are capable of communicating with one another. Such cooperative jobs are logically organized into a "group", with each cooperative job being designated as a "member" of the group. Group members, however, need not necessarily operate on a common task—typically all that is required for members of a group is that such members be capable of communicating with one another during execution.

FIG. 1, for example, illustrates an exemplary cluster of nodes 10, also denoted herein for purposes of example by the sequential identifiers 1, 2, 3 . . . N. Resident within various nodes are a plurality of jobs S1–SN and T1–TN forming the members of an exemplary pair of groups in the clustered computer system, where the groups are related as source and target groups. As discussed above, a target group typically "depends" from a source group, as a target group is not permitted to perform certain actions (e.g., a failover) until after the source group has done so.

As shown in this figure, nodes in a clustered computer system are not required to participate in all groups (e.g., as with node 4). Moreover, multiple jobs from a given group may be resident in the same node (e.g., as with node 3).

Also illustrated in FIG. 1 is an exemplary cluster control group, including a group member, referred to herein as a cluster control (CTL) job, resident on every node participating in the cluster (e.g., jobs CTL1–CTLN, resident respectively on nodes 1–N). Most if not all conventional clustering environments incorporate functionality analogous to a cluster control group, which typically manages various cluster functions such as starting and ending nodes, adding or removing nodes to or from a cluster, etc., and which typically requires that a member job be resident on each node participating in a cluster. Moreover, it is anticipated that each node participating in a cluster will incorporate lower-level functionality, referred to herein as either the clustering infrastructure or clustering resource services, which handles basic clustering functionality, e.g., inter-node communications, message ordering, heartbeat monitoring, etc.

It is anticipated that the cluster control group (or another analogous group) member on a failing node will typically initiate the generation of distress signals to other nodes on behalf of a node being shutdown, typically in response to detection of an error or via a shutdown message generated by another group member on the same node that has detected an error. However, it should be appreciated by one of ordinary skill in the art having the benefit of the instant disclosure that the invention does not require implementation of such functionality within a cluster control group, and with the assistance of the clustering infrastructure in the precise manner discussed herein in all instances. Moreover, detection of an error, or notification of a cluster control group to initiate a shutdown, may be handled by other groups, members or other entities in a clustered computer system consistent with the invention. Therefore, the invention is not limited to the particular clustering environment disclosed herein.

As an example of the initiation of a shutdown, assume that the need for a shutdown has been detected by a job S2 in the source group (e.g., due to an error), resident on node 2 of the clustered computer system of FIG. 1. Consistent with the invention, an automated shutdown process is initiated by job S2 where the other jobs resident on node 2 will be preemptively terminated, and node leave Membership Change Messages (MCM's) will be processed by the jobs resident on the other nodes to handle any dependent failovers in an appropriate manner as will be discussed in greater detail below.

It will be appreciated that nomenclature other than that specifically used herein to describe the handling of computer tasks by a clustered computer system may be used in other environments. Therefore, the invention should not be limited to the particular nomenclature used herein, e.g., as to protocols, requests, messages, jobs, groups, etc.

Figure 2:
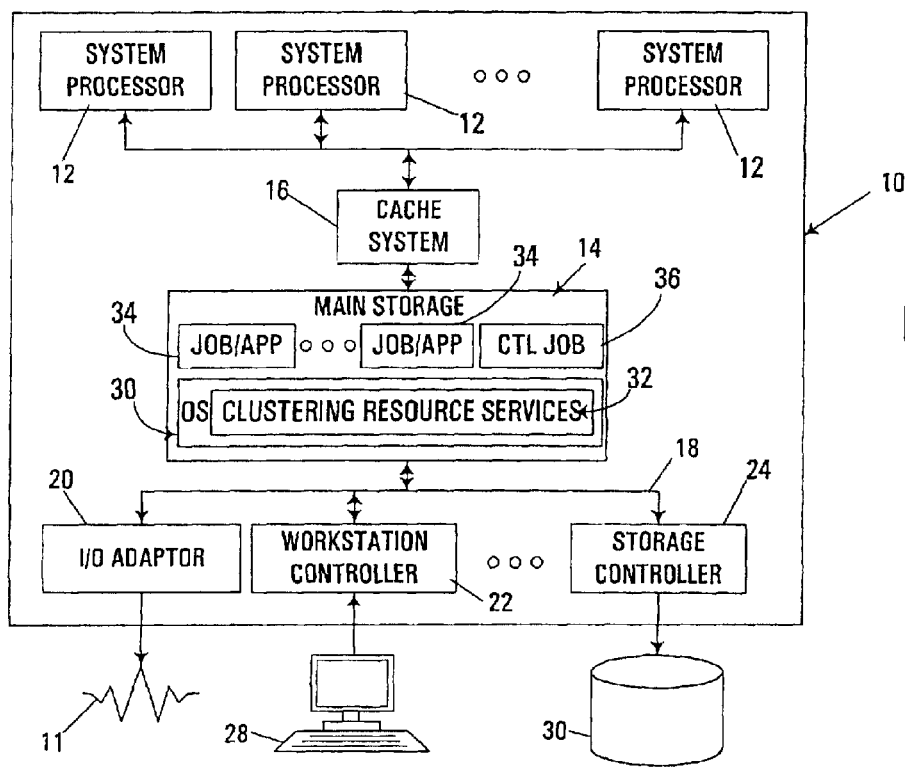
FIG. 2 is a block diagram of a node in the clustered computer system of FIG. 1.

Now turning to FIG. 2, an exemplary hardware configuration for one of the nodes 10 in clustered computer system 8 is shown. Node 10 generically represents, for example, any of a number of multi-user computers such as a network server, a midrange computer, a mainframe computer, etc. However, it should be appreciated that the invention may be implemented in other computers and data processing systems, e.g., in stand-alone or single-user computers such as workstations, desktop computers, portable computers, and the like, or in other programmable electronic devices (e.g., incorporating embedded controllers and the like).

Node 10 generally includes one or more system processors 12 coupled to a main storage 14 through one or more levels of cache memory disposed within a cache system 16. Further more, main storage 14 is coupled to a number of types of external devices via a system input/output (I/O) bus 18 and a plurality of interface devices, e.g., an input/output adaptor 20, a workstation controller 22 and a storage controller 24, which respectively provide external access to one or more external networks (e.g., a cluster network 11), one or more workstations 28, and/or one or more storage devices such as a direct access storage device (DASD) 30. Any number of alternate computer architectures may be used in the alternative.

To implement automated node shutdown functionality consistent with the invention, each node in a cluster typically includes a clustering infrastructure to manage the clustering-related operations on the node. For example, node 10 is illustrated as having resident in main storage 14 an operating system 30 implementing a cluster infrastructure referred to as clustering resource services 32. One or more jobs or applications 34 are also illustrated, each having access to the clustering functionality implemented within clustering resource services 32. Moreover, node 10 typically includes a cluster control (CTL) job 36 that participates in a cluster control group to assist in managing clustering functionality on behalf of the node. It will be appreciated, however, that the functionality described herein may be implemented in other layers of software in node 10, and that the functionality may be allocated among other programs, computers or components in clustered computer system 8. Therefore, the invention is not limited to the specific software implementation described herein.

The discussion hereinafter will focus on the specific routines utilized to implement the above-described automated node shutdown functionality. The routines executed to implement the embodiments of the invention, whether implemented as part of an operating system or a specific application, component, program, object, module or sequence of instructions, will also be referred to herein as "computer programs," or simply "programs." The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

It will be appreciated that various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 3:
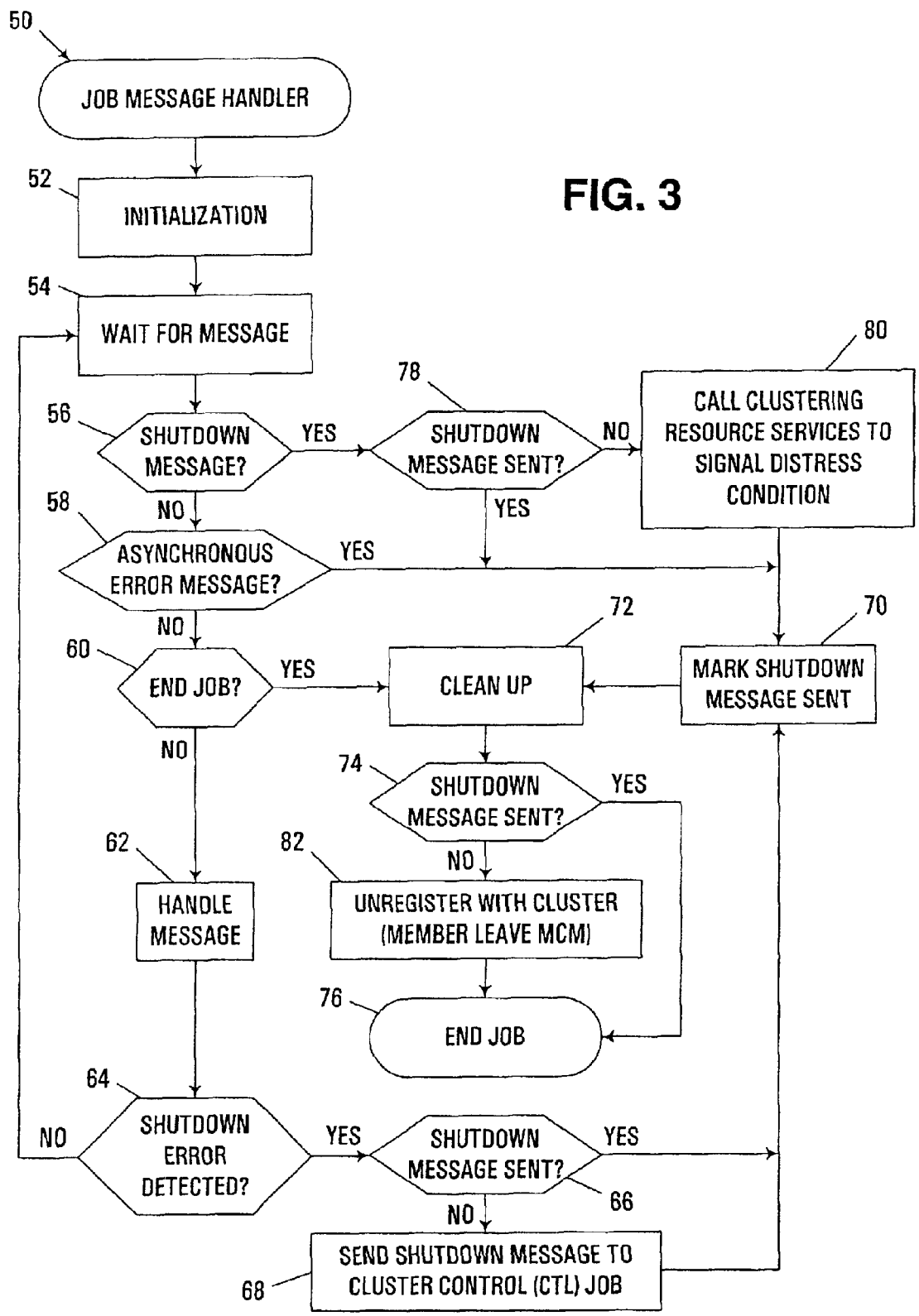
FIG. 3 is a flowchart illustrating the program flow of a message handler routine executed by each job resident on a node in the clustered computer system of FIG. 1, illustrating the sequence of operations that occur during a node shutdown operation.

Now turning to FIG. 3, a specific embodiment of the invention, for use in an OS/400 clustering environment utilizing AS/400 or I series servers from International Business Machines Corporation is described. In particular, FIG. 3 illustrates a message handler routine 50 executed by each job resident on each node in the clustered computer system. While a single routine is shown in FIG. 3, it will be appreciated that a separate instance of the routine typically runs for each active job on a node, including the cluster control job for the node. Messages passed between jobs are handled by the respective message handlers on those jobs. The message handlers on a node may all be identical, or may be tailored somewhat for each job.

As will become more apparent below, this embodiment of the invention relies on a distress signal protocol to notify other nodes in a cluster of a failure on a node. See, for example, U.S. Ser. No. 09/281,026, filed on Mar. 30, 1999 by Block et al., which is incorporated by reference herein, for a discussion of a distress signal protocol, where the distress signal is generated in response to a failure detected by the clustering infrastructure, and is processed by receiving nodes by expelling all members from a failing node. Also see, for example U.S. Ser. No. 09/481,177, filed on Jan. 12, 2000 by Funk, Goft, Kloper, Pinter and Yeger-Lotem, which is incorporated by reference herein, for a discussion of membership change protocol and ordered messaging in general. It will be appreciated, however, that in other clustering environments, e.g., in environments supported by other manufacturers, alternate protocols may be utilized to perform the various shutdown-related operations described herein. Therefore, the invention is not limited to the OS/400 environment described herein.

Routine 50, which represents the primary message handler for a job executing in a clustered computer environment, typically begins with any necessary initialization operations upon startup of a job, e.g., as shown in block 52. Then, as shown in block 54, the message handler typically waits for messages directed to the job. It should be appreciated that a message handler is typically implemented using an event-driven messaging infrastructure, although a procedural-based routine is illustrated in FIG. 3 to facilitate a general understanding of the operation of the illustrated embodiment of the invention. Other manners of notifying, controlling and/or passing information to a job may be used as an alternative to an event-driven messaging infrastructure.

Blocks 56–60 illustrate a number of types of messages that may be detected by the message handler, including a shutdown message (block 56), an asynchronous error (AE) message (block 58) and an end job message (block 60). Other messages are detected and handled in a conventional manner in block 62.

For the purpose of this discussion, it is assumed that an error may be detected by a member when handling a message during the normal operation of the member. Detection of such an error is represented in block 64 upon completion of the processing of the message in block 62, and the error may include any of the aforementioned error types that may occur during the execution of a member. These members are collectively referred to as "shutdown errors" as they represent errors that require the node as a whole to be shut down prior to reintroducing the node to the clustering environment. Other types of errors may only require that the member be terminated, and a member leave membership change protocol may still be initiated in a conventional manner. These latter types of errors are not illustrated in FIG. 3, as conventional program code may be utilized to handle such other errors. Moreover, block 64 includes a path back to block 54 to represent successful handling of a message without error. It should also be appreciated that the functionality of block 64 may be called in response to an interrupt or other exception handling processing during handling of a message in block 62.

In response to detection of a shutdown error, block 64 passes control to block 66 to first determine whether a shutdown message has already been sent. In the illustrated embodiment, each member on a node includes an indicator that indicates whether a shutdown message has been sent by that member to the cluster control job resident on the node. The purpose of the indicator is to ensure that, once a shutdown has been initiated on a node, additional detected errors will be disregarded so that the shutdown process can proceed unimpeded.

In the illustrated embodiment, each member, including the cluster control job, includes a local variable that stores this indicator. In other embodiments, however, the shutdown message indicator may be shared by all members, so that, once set, any additional errors that are detected once a shutdown has been initiated will be disregarded without even a call to the cluster control job on the node. Other manners of indicating when a shutdown process has been initiated may be utilized in the alternative, so that the initiation of a single node leave membership change protocol will occur in response to any shutdown error.

In the illustrated embodiment, if the shutdown message has not yet been sent by a particular member job, block 66 passes control to block 68 to send a shutdown message to the cluster control job resident on the same node. Put another way, detection of an error by a particular member resident on a node results in initiation of a shutdown process that is directed principally by the cluster control job. In some embodiments, the cluster control job may initially detect an error, whereas in other embodiments, all or some of the other members resident on a node may initially detect an error. The program flow of FIG. 3 handles both such situations.

Once a shutdown message is sent to the cluster control job, block 68 passes control to block 70 to mark the shutdown message sent indicator for the member job so as to indicate that the shutdown message has been sent. Control then passes to block 72 to initiate a job termination operation whereby any cleanup activities necessary for terminating the job are performed. Cleanup operations may include, for example, closing any open files, persisting objects to disk, etc. It will be appreciated that the cleanup activities will typically vary from job to job.

Next, block 74 determines whether the shutdown message sent indicator indicates that the shutdown message has already been sent. Given that, in this instance, the shutdown message sent indicator is set in block 70, block 74 passes control to block 76 to terminate the job.

Returning to block 66, if a shutdown error is detected and it is determined that a shutdown message has already been sent, block 68 is bypassed, and program flow continues to block 70 to terminate the job in the manner discussed above. Thus, it may be seen from block 66 that detections of multiple shutdown-type errors by a particular member will result in only a single shutdown message being sent to the cluster control job. Any further error detections are disregarded.

Once a shutdown message has been sent to the cluster control job, the cluster control job will detect the shutdown message in block 56, assuming in this instance that an instance of routine 50 is being executed on the cluster control job as with any other job resident on the node. In response to the shutdown message, block 56 passes control to block 78 to determine whether the shutdown message sent indicator for the cluster control job has been set. If so, control passes to block 70 to mark the shutdown message sent indicator for the cluster control job and initiate termination of the cluster control job on the node (block 78 could alternatively branch to block 72). If, however, the local shutdown message sent indicator for the cluster control job indicates that this is the first shutdown message received by the cluster control job, control passes to block 80 to call clustering resource services to signal a "distress" condition. Control then passes to block 70 to initiate termination of the cluster control job.

In the illustrated embodiment, signaling a "distress" condition to the clustering resource services results in two principal operations occurring so as to effectively initiate an ordered shutdown process for the node. First, all surviving groups on the other nodes are notified to ultimately process node leave membership change protocols on each of the groups, thereby unregistering the affected node and its members from the cluster. Second, all members on the affected node are preemptively terminated, i.e., without regard to detection of the error by each individual member.

The call to the clustering resource services to signal the "distress" condition initiates a distress signal protocol as discussed in the aforementioned Block et al. application. For example, in a clustered computer system that incorporates a clustering engine layered on top of a cluster communications layer in a clustering infrastructure, the signaling of the distress signal may be passed to the cluster communications layer to send a distress signal to the cluster communication layers of the other nodes in the system. Upon receipt, each node may then interpret the distress signal as a node leave Membership Change Message for the originating node, in particular, for each active member on the receiving node that shares group membership with a member on the node that is leaving the cluster. Typically, the cluster communications layer is a lower level layer than the clustering engine that typically manages membership change protocols, and as such, the sending of a distress signal has the same effect as a higher level node leave Membership Change Message passed between the clustering engines on the nodes. In the alternative, the signaling of the distress condition may initiate transmission of a node leave Membership Change Message from the clustering engine on the unregistering node.

The other effect of the call to the clustering resource services to signal the distress condition is the generation of asynchronous error messages for each active member on the node being unregistered. In particular, upon the transmission of a distress signal from the cluster communications layer on the node being unregistered, the local clustering engine on that node may interpret the distress signal as indicating that the clustering resource services are being terminated. As a result, termination of the clustering resource services will generate asynchronous error messages for each active member job on the node. Following the generation of the asynchronous error messages, the clustering resource services will proceed to terminate using cleanup code and any other necessary functionality to adequately terminate the clustering resource services.

Returning to FIG. 3, once the clustering resource services has been signaled with the distress condition in block 80, control passes to block 70 to mark the shutdown message sent indicator for the cluster control job, and then to block 72 to terminate the cluster control job, in the same manner as other jobs as discussed above.

As discussed above, the generation of the distress condition by the cluster communications layer results in the generation of asynchronous error messages to each active member job on the node. For each such job, therefore, block 58 for that job's message handler detects the asynchronous error message, and passes control to block 70 to proceed with marking the shutdown message sent indicator for that job, and then proceeding to terminate the job. It is to be noted that, since an asynchronous error message is sent in response to a distress condition, a shutdown message does not need to be sent by the instant job that receives the asynchronous error message. As such, the job is preemptively terminated without regard for and prior to detection of the error that initiated the shutdown. In this manner, all active jobs on the node being shut down are terminated in an orderly and efficient manner.

As discussed above, in some instances, a job may be terminated in such a manner that a complete shut down of the node is not desired. To handle the termination of a job in this manner, an end job message is sent to the job and processed by the job message handler, as illustrated at block 60, which passes control to block 72 to initiate cleanup and termination of the job. In the illustrated embodiment, functionality is incorporated to distinguish this type of termination from a termination that might occur during a node shutdown. Thus, assuming that a job is being terminated independent of any node shutdown, upon completion of block 72, block 74 will detect that the shutdown message has not been sent, via the indicator associated with the job. In that event, control will pass to block 82 to unregister the job with the cluster, typically by initiating a member leave membership change protocol. As such, the other members of the group for the job being terminated will be notified of the termination of the job. Control then passes to block 76 to terminate the job in a manner known in the art. As such, it may be seen that the use of a shutdown message sent indicator permits member leave MCM's to be generated in appropriate circumstances, yet cause the initiation of node leave membership change operations to occur in the event of a member-detected node failure.

In operation, therefore, an initial detection of an error by a member job resident on a failing node will result in the generation of a shutdown message that is passed to a cluster control job resident on the same node. For the example of FIG. 1, therefore, detection of the error by job S2 results in a shutdown message being sent to job CTL2.

In response to the shutdown message, the cluster control job calls clustering resource services to signal a distress condition, whereby distress signals are sent to the other nodes in the system, and are interpreted by those other nodes as node leave membership change requests. Each job S1, S3 . . . SN; T1, T3 . . . TN and CTL1, CTL3 . . . CTLN will thus unregister the appropriate group member on node 2 for its respective group (i.e., jobs S2, T2 and CTL2).

In addition, the distress condition results in the generation of asynchronous error messages for every active job on the failing node (e.g., job T2, was well as jobs S2 and CTL2, if those jobs have not yet completed their cleanup and termination operations).

In the case of the job that detected the error, the cluster control job, and every job that receives the asynchronous error message, the status of the shutdown message sent indicator for that job is queried to ensure that duplicate distress conditions are not generated. Moreover, each job on the node being shut down is terminated in an orderly fashion, as is the clustering resource services for the node. Moreover, by virtue of the node leave membership change protocols that are processed on the other nodes in the system, dependent failovers are permitted to occur throughout the system. Thus, clustering, as well as the various cluster-related jobs on a node, are terminated in an orderly fashion, thereby shutting down the node to clustering. Moreover, given that each member on the node being shut down is terminated prior to having to independently detect a relevant error, the shutdown process is more orderly and efficient than would otherwise occur if each job was required to independently detect its own error.

Various modifications may be made without departing from the spirit and scope of the invention. For example, a job that detects an error may directly signal a distress condition, rather than relying on the cluster control job on the node. Moreover, initial detection of an error may occur within the cluster control job for that node. Other modifications will be apparent to one of ordinary skill in the art having the benefit of the instant disclosure. Therefore, the invention lies in the claims hereinafter appended.

What is claimed is:

1. A method of shutting down a node in a clustered computer system, the method comprising:
   (a) detecting a failure in a first node among a plurality of nodes in a clustered computer system, wherein detecting the failure is performed by a first group member resident on the first node;
   (b) in response to detecting the failure, transmitting a signal to each of the other nodes in the plurality of nodes to initiate on each of the other nodes a node leave operation that terminates clustering with the first node; and
   (c) in response to detecting the failure, preemptively terminating a second group member resident on the first node prior to any detection of the failure by the second group member.

2. The method of claim 1, wherein the first group member is a cluster control group member.

3. The method of claim 1, wherein the first group member is a member of a group other than a cluster control group, wherein the method further comprises sending a shutdown message to a cluster control group member resident on the first node, and wherein transmitting the signal to each of the other nodes and preemptively terminating the second group member are each initiated by the cluster control group member in response to the shutdown message from the first group member.

4. The method of claim 1, wherein detecting the failure comprises detecting an error that requires clustering to terminate on the first node.

5. The method of claim 4, wherein the error is selected from the group consisting of a communication error, a protocol error, failure or termination of a cluster name server, failure or termination of a cluster control group member, failure or termination of a cluster liveliness monitor, corruption of a critical cluster object, and combinations thereof.

6. The method of claim 1, wherein transmitting the signal comprises transmitting a distress signal to each other node in the plurality of nodes.

7. The method of claim 1, further comprising, at each of the other nodes in the plurality of nodes, processing the distress signal on such other node by initiating a node leave operation for each group member resident on such other node that is a member of a group that has another member resident on the first node.

8. The method of claim 1, further comprising, at another node in the plurality of nodes, performing a dependent failover in response to receiving the signal from the first node.

9. The method of claim 1, wherein preemptively terminating the second group member comprises notifying each active group member resident on the first node that clustering is ending on the first node.

10. The method of claim 9, further comprising ending clustering on the first node after notifying each active group member resident on the first node.

11. The method of claim 9, wherein notifying each active group member includes sending an error message to each active group member.

12. The method of claim 1, further comprising disregarding a second failure detected from a group member, other than the first group member, that is resident on the first node if transmission of the signal has already been initiated.

13. A method of shutting down a node in a clustered computer system, the method comprising:
   in a group member resident on a first node among a plurality of nodes in a clustered computer system, initiating a shutdown of the first node;

shutting down the first node in response to initiation of the shutdown by the group member; and detecting a failure in the first node with the group member, wherein initiating the shutdown of the first node is performed in response to detecting the failure; wherein shutting down the first node comprises transmitting a signal to each of the other nodes in the plurality of nodes to initiate on each of the other nodes a node leave operation that terminates clustering with the first node; and preemptively terminating a second group member resident on the first node prior to any detection of the failure by the second group member.

14. The method of claim 13, wherein initiating the shutdown of the first node comprises sending a shutdown message from the group member to a cluster control group member, and wherein shutting down the first node further comprises:

notifying a clustering infrastructure resident on the first node using the cluster control group member to transmit the signal and initiate preemptive termination of the second group member; and terminating the clustering infrastructure.

15. The method of claim 13, wherein transmitting the signal comprises transmitting a distress signal to each other node in the plurality of nodes, the method further comprising, at each of the other nodes in the plurality of nodes, processing the distress signal on such other node by initiating a node leave operation for each group member resident on such other node that is a member of a group that has another member resident on the first node.

16. The method of claim 13, wherein preemptively terminating the second group, member comprises notifying each active group member resident on the first node that clustering is ending on the first node.

17. The method of claim 13, further comprising disregarding a second failure detected from another group member resident on the first node if the signal has already been transmitted.

18. An apparatus, comprising:
(a) a memory accessible by a first node among a plurality of nodes in a clustered computer system; and
(b) first and second group members resident in the memory, the first group member configured to detect a failure in the first node; and
(c) a program resident in the memory, the program configured to shut down the first node in response to the detected failure by transmitting a signal to each of the other nodes in the plurality of nodes to initiate on each of the other nodes a node leave operation that terminates clustering with the first node, and preemptively terminating the second group member resident on the first node prior to any detection of the failure by the second group member.

19. The apparatus of claim 18, wherein the first group member is a member of a group other than a cluster control group, wherein the first group member is configured to send a shutdown message to a cluster control group member resident on the first node, and wherein the cluster control group member is configured to initiate transmission of the signal to each of the other nodes and termination of the second group member in response to the shutdown message from the first group member.

20. The apparatus of claim 18, wherein the program is configured to transmit the signal by transmitting a distress signal to each other node in the plurality of nodes.

21. The apparatus of claim 18, wherein the program is configured to terminate the second group member by notifying each active group member resident on the first node that clustering is ending on the first node.

22. The apparatus of claim 21, wherein the program is further configured to end clustering on the first node after notifying each active group member resident on the first node.

23. The apparatus of claim 18, wherein the program is further configured to disregard a second failure detected from a group member, other than the first group member, that is resident on the first node if transmission of the signal has already been initiated.

24. A clustered computer system, comprising first and second nodes coupled to one another over a network, wherein:

(a) the first node is configured to shut down in response to a failure detected in the first node by a first group member resident on the first node by transmitting a signal to the second node and preemptively terminating a second group member resident on the first node prior to any detection of the failure by the second group member; and (b) the second node is configured to initiate a node leave operation that terminates clustering with the first node in response to the signal from the first node.

25. The clustered computer system of claim 24, wherein the second node is configured to initiate a node leave operation for each group member resident on the second node that is a member of a group that has another member resident on the first node.

26. The clustered computer system of claim 25, wherein the second node is configured to perform a dependent failover in response to receiving the signal from the first node.

27. A program product, comprising:
(a) first and second group members, the first group member configured to detect a failure in a first node among a plurality of nodes in a clustered computer system;
(b) a program configured to shut down the first node in response to the detected failure by transmitting a signal to each of the other nodes in the plurality of nodes to initiate on each of the other nodes a node leave operation that terminates clustering with the first node, and preemptively terminating the second group member resident on the first node prior to any detection of the failure by the second group member, and
(c) a computer readable medium bearing the program.

* * * * *